(12) United States Patent
Walker

(10) Patent No.: US 11,048,527 B2
(45) Date of Patent: Jun. 29, 2021

(54) ACCESSING CONFLICTING FRAMEWORKS AND CLASSES

(71) Applicant: Citrix Systems, Inc., Fort Lauderdale, FL (US)

(72) Inventor: James Robert Walker, Deerfield Beach, FL (US)

(73) Assignee: Citrix Systems, Inc., Fort Fauderdale, FL (US)

( * ) Notice: Subject to any disclaimer, the term of this patent is extended or adjusted under 35 U.S.C. 154(b) by 63 days.

(21) Appl. No.: 15/711,124

(22) Filed: Sep. 21, 2017

(65) Prior Publication Data

US 2019/0087207 A1    Mar. 21, 2019

(51) Int. Cl.
*G06F 9/445* (2018.01)
(52) U.S. Cl.
CPC .................. *G06F 9/44521* (2013.01)
(58) Field of Classification Search
CPC ..... G06F 8/00–78; G06F 9/445–44594; G06F 11/36–3696
See application file for complete search history.

(56) References Cited

U.S. PATENT DOCUMENTS

| | | | | |
|---|---|---|---|---|
| 8,225,310 B1 * | 7/2012 | Robertson | ................. | G06F 8/65 717/168 |
| 8,276,125 B2 * | 9/2012 | Fan | ........................ | G06F 9/445 717/118 |
| 9,250,891 B1 * | 2/2016 | Beranek | ..................... | G06F 8/70 |
| 2003/0200350 A1 * | 10/2003 | Kumar | ..................... | G06F 8/71 719/315 |

(Continued)

OTHER PUBLICATIONS

Peterson, Brett; "Understanding J2EE Application Server ClassLoading Architectures", https://www.theserverside.com/news/1364680/Understanding-J2EE-Application-Server-ClassLoading-Architectures, Published May 1, 2002, Retrieved Jul. 17, 2020 (Year: 2002).*

(Continued)

*Primary Examiner* — Doon Y Chow
*Assistant Examiner* — Joanne G Macsiano
(74) *Attorney, Agent, or Firm* — Banner & Witcoff, Ltd.

(57) ABSTRACT

Methods and systems for accessing conflicting frameworks and classes are presented. In some embodiments, a conflicting frameworks computing platform may receive an application classloader corresponding to a mobile application. The application classloader may indicate one or more child application-defined classloaders. Subsequently, the conflicting frameworks computing platform may create a framework-defined classloader comprising a first class that conflicts with a second class in the one or more child application-defined classloaders. Further, the conflicting frameworks computing platform may create a framework-termination classloader. The framework-termination classloader may be a parent classloader of the framework-defined classloader. Next, the conflicting frameworks computing platform may replace, using a reflection function, the application classloader with a new application classloader. The new application classloader may indicate the one or more child application-defined classloaders, the framework-defined classloader, and the framework-termination classloader.

20 Claims, 14 Drawing Sheets

(56) References Cited

U.S. PATENT DOCUMENTS

| | | | | |
|---|---|---|---|---|
| 2007/0113234 | A1* | 5/2007 | Chinnappa | G06F 9/44521 718/104 |
| 2008/0005287 | A1* | 1/2008 | Harvey | G06F 8/20 709/220 |
| 2008/0271002 | A1* | 10/2008 | Susarla | G06F 9/44521 717/148 |
| 2009/0144751 | A1* | 6/2009 | Fan | G06F 9/445 719/315 |
| 2012/0266149 | A1* | 10/2012 | Lebert | G06F 9/44563 717/166 |

OTHER PUBLICATIONS

Welch, Ian, and Robert Stroud. "Dalang—a reflective Java extension." Proc. of Workshop on Reflective Programming in C++ and Java. 1998. (Year: 1998).*

Mei, Hong, and Gang Huang. "PKUAS: An architecture-based reflective component operating platform." Proceedings. 10th IEEE International Workshop on Future Trends of Distributed Computing Systems, 2004. FTDCS 2004 . . . IEEE, 2004. (Year: 2004).*

Alhazbi, Saleh, and Aman Jantan. "Multi-level mediator-based technique for classes hot swapping in java applications." 2006 2nd International Conference on Information & Communication Technologies. vol. 2. IEEE, 2006. (Year: 2006).*

"Conflicting Library Version in a Java Maven Project," Stack Overflow, Accessed Sep. 21, 2017, https://stackoverflow.com/questions/19659425/conflicting-library-version-in-a-java-maven-project.

"How to Resolve Jar Conflicts in Runtime?" Stack Overflow, Accessed Sep. 21, 2017, https://stackoverflow.com/questions/29554225/how-to-resolve-jar-conflicts-in-runtime.

* cited by examiner

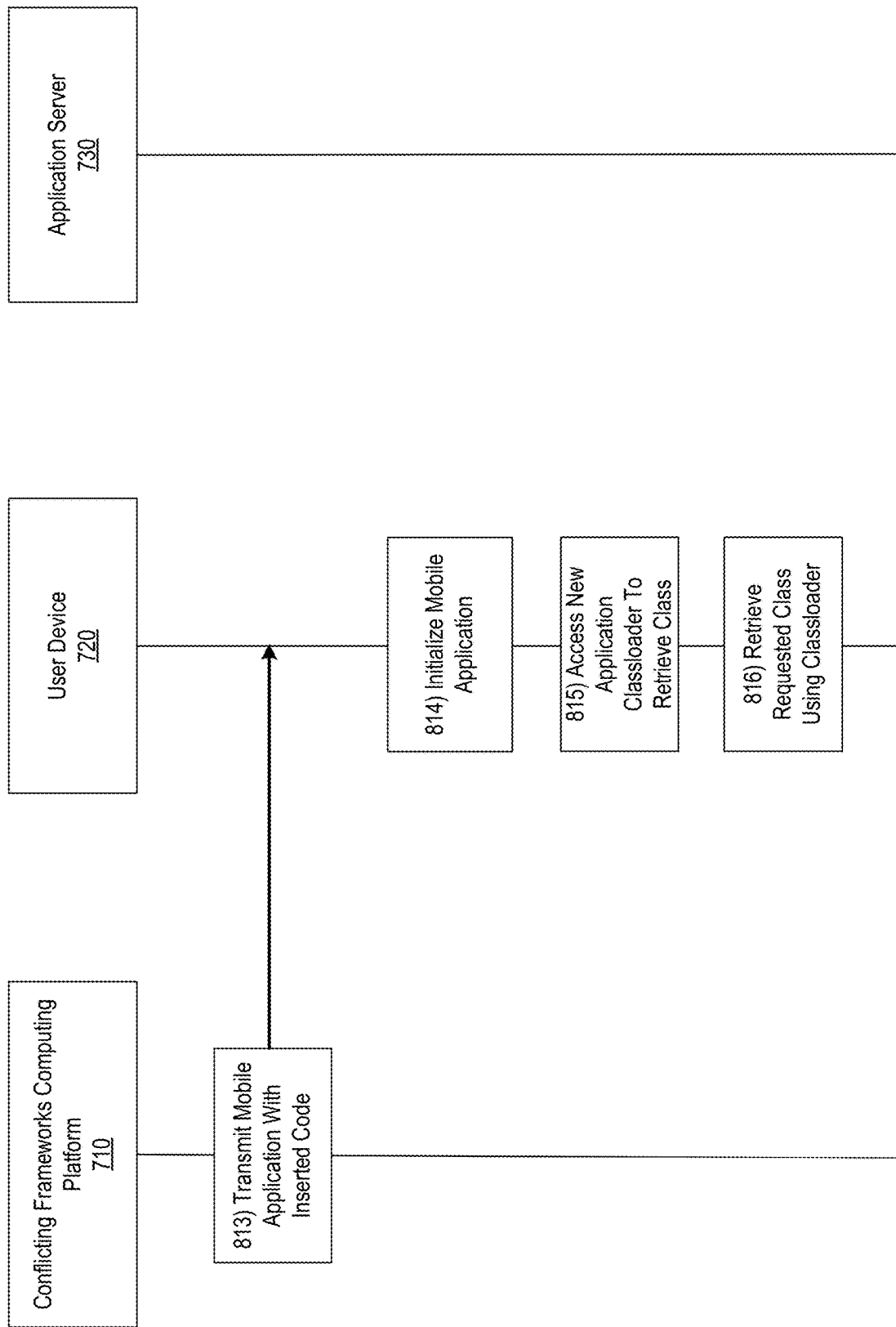

ACCESSING CONFLICTING FRAMEWORKS AND CLASSES

FIELD

Aspects described herein generally relate to computer hardware and software, digital processing systems, and multicomputer data transfer. In particular, one or more aspects of the disclosure relates to computer hardware and software for accessing conflicting software frameworks and classes.

BACKGROUND

A user device may load a plurality of different libraries or frameworks to initialize a mobile application. For example, the user device may use the plurality of libraries or frameworks to define classes used by the mobile application. However, as mobile applications become more complex, the number of libraries, including different versions of a same library, may increase exponentially. The user device may have difficulty identifying and/or retrieving classes from different versions of the same library, which may include different versions of particular classes. For example, the mobile application may require a class from version 1.0 of a library. However, the user device may retrieve the class from version 1.2 of the library. The class retrieved by the user device may be incompatible with other features of the mobile application, and may cause the mobile application to fail. In some instances, this may present technical challenges.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

In accordance with one or more embodiments, a computing platform having at least one processor, memory, and a communication interface may receive, by the at least one processor, an application classloader corresponding to a mobile application. The application classloader may indicate one or more child application-defined classloaders. Subsequently, the computing platform may create, by the at least one processor, a framework-defined classloader comprising a first class that conflicts with a second class in the one or more child application-defined classloaders. Thereafter, the computing platform may create, by the at least one processor, a framework-termination classloader. The framework-termination classloader may be a parent classloader of the framework-defined classloader. In addition, the computing platform may replace, by the at least one processor and using a reflection function, the application classloader with a new application classloader. The new application classloader may indicate the one or more child application-defined classloaders, the framework-defined classloader, and the framework-termination classloader. Further, the computing platform may transmit, by the at least one processor, via the communication interface, and to a user device, the new application classloader, the framework-defined classloader, and the framework-termination classloader.

In some instances, the computing platform may insert, by the at least one processor, application wrapping code into a source code of the mobile application. Additionally, the source code may indicate the second class. Further, the application wrapping code may indicate the first class that conflicts with the second class. In some examples, the first class and the second class may be different, incompatible versions of a same class. Further, the first class and the second class may comprise a same class name.

In some embodiments, the one or more child application-defined classloaders may indicate one or more third-party libraries comprising a plurality of classes. Subsequently, the computing platform may identify, by the at least one processor and from the plurality of classes, the second class. Further, the computing platform may identify, by the at least one processor and based on the second class, the first class.

In some instances, the computing platform may create, by the at least one processor, a framework library comprising the first class. Subsequently, the computing platform may link, by the at least one processor, the framework-defined classloader to the framework library. In some embodiments, the computing platform may define, by the one or more processors, a hierarchy of classloaders corresponding to the mobile application. The hierarchy of classloaders may comprise the application classloader and the one or more child application-defined classloaders. Further, the computing platform may insert, by the one or more processors and in the hierarchy of classloaders, the framework-termination classloader. The framework-termination classloader may be a child classloader of the application classloader.

In some examples, the framework-defined classloader may indicate a framework library comprising the first class. The application classloader may indicate a third-party library comprising the second class. The framework-defined classloader may be a child classloader to the application classloader. Further, the computing platform may receive a request for a requested class. The requested class may comprise a same class name as the first class and the second class. Additionally, the computing platform may forward the request to the framework-defined classloader. Subsequently, the computing platform may retrieve the requested class from the framework library.

In some instances, the computing platform may forward the request to a framework-termination classloader. Additionally, in response to forwarding the request to the framework-termination classloader, the computing platform may receive a class not found exception. Further, the retrieving the requested class from the framework library may be based on the class not found exception. In some examples, the forwarding the request to the framework-defined classloader may be in response to determining, based on the new application classloader, that the requested class is for the first class. In some embodiments, in response to determining, based on the new application classloader, that the requested class is for the second class, the computing platform may forward the request to the application classloader.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 8A-8D depict an example event sequence for accessing conflicting frameworks and classes in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
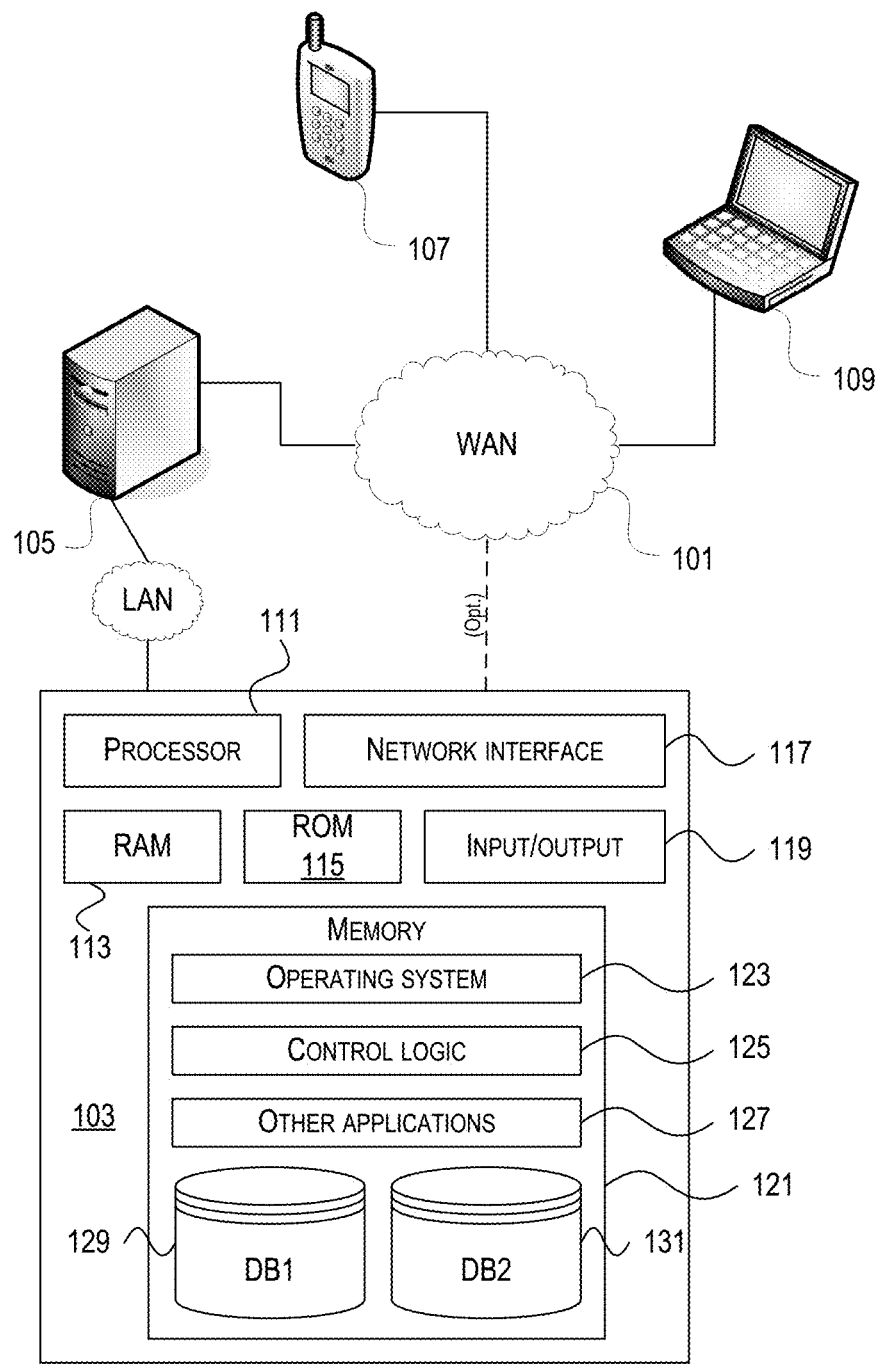
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
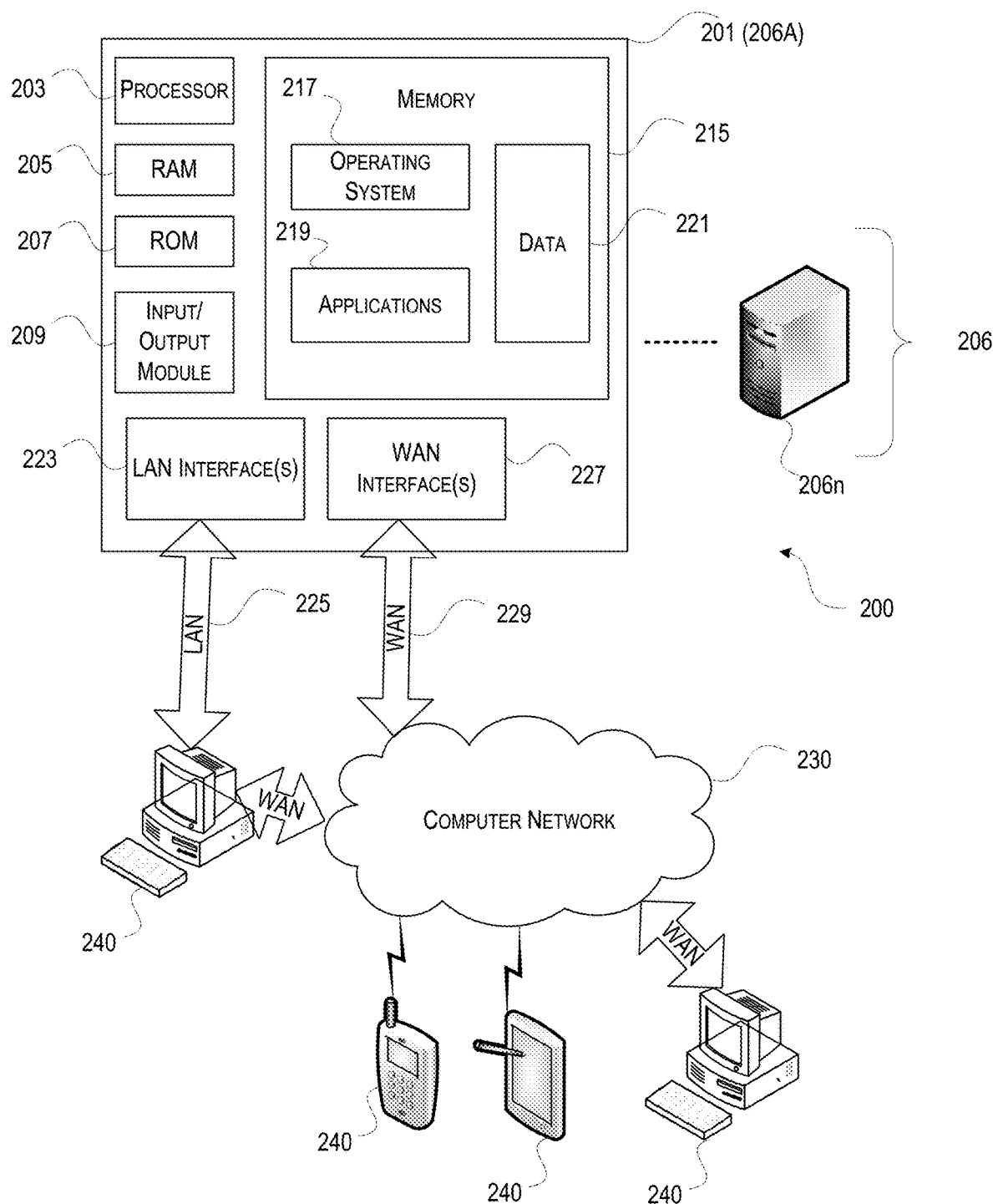
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Retrieving Classes Using Java Classloader Hierarchy

As described above, a user device, such as a client device 240, may download a mobile application from a server, such as server 206. For example, the user device, running an iOS operating system or an Android operating system, may download the mobile application, including the mobile application code, such as source code or application code, and one or more libraries and/or frameworks. The mobile application code may reference the libraries and/or frameworks. The libraries and/or frameworks may be standard libraries and/or frameworks, such as a JAVA library and/or framework. For example, the JAVA library may include block of codes, indicating class attributes, that may be referenced by the mobile application. Rather than inputting a block of code for each instance of the class, a programmer of the mobile application may call the class from the JAVA library. The user device, at run-time, may retrieve the class attributes from the JAVA library. Additionally, the operating system, such as an ANDROID operating system, may include an operating system library with their own classes, including class attributes, that may be used by the mobile application.

Further, a programmer of the mobile application may create an application library and/or framework. For example, the programmer may provide and/or create unique classes, including class attributes, for the mobile application. Thus, instead of defining a class each time the class is used in the mobile application, the programmer may store the class in one or more application libraries and/or frameworks. At run-time, when the user device identifies the class, the user device may retrieve class from the library and/or framework using the class name.

Figure 3:
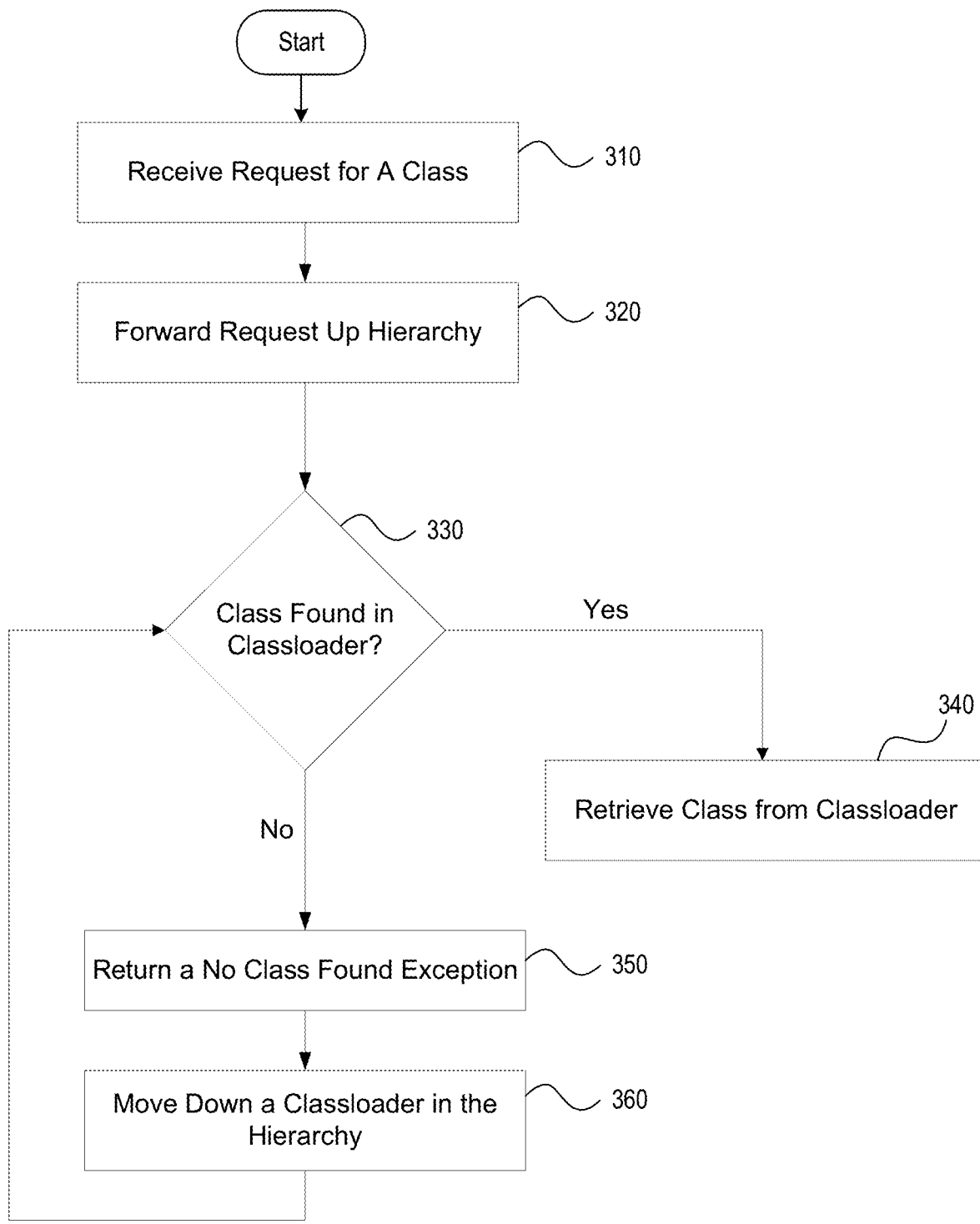
FIG. 3 depicts an example classloader hierarchy method for accessing conflicting frameworks and classes in accordance with one or more illustrative aspects described herein.
Figure 4:
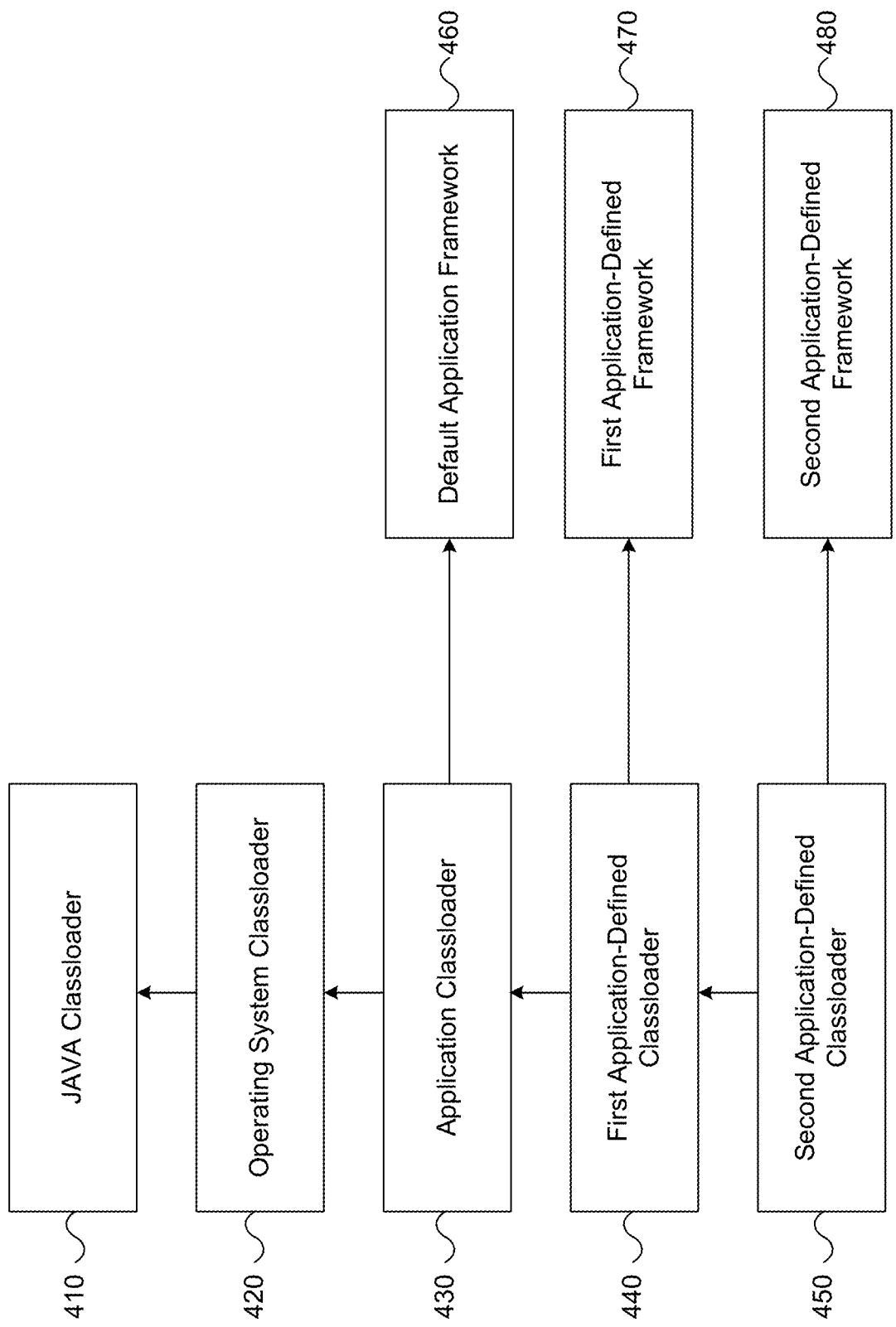
FIG. 4 depicts an example classloader hierarchy for accessing conflicting frameworks and classes in accordance with one or more illustrative aspects described herein.

FIG. 3 depicts an example classloader hierarchy method for accessing conflicting frameworks and classes in accordance with one or more illustrative aspects described herein. Referring to FIG. 3, at step 310, a computing device, such as a user device, may receive a request for a class. For example, after downloading the mobile application, the user device may initialize and run the mobile application. During run-time of the mobile application, the user device may request a class from a library. But, the mobile application may reference multiple different libraries, including the JAVA library, the operating system library, and the application-defined libraries. Therefore, prior to retrieving the class and/or class attributes, the user device may determine the library that stores the requested class. The user device may use a classloader function to identify the library storing the requested class. FIG. 4 may depict an example classloader hierarchy for identifying the library storing the requested class.

Referring to FIG. 4, the JAVA classloader 410, operating system classloader 420, and/or the application classloader 430 may reference a default application library (e.g., default application framework 460) that comprises default classes and class attributes for the mobile application. The first application-defined classloader 440 and the second application-defined classloader 450 may reference application specific libraries, such as a first application-defined framework 470 and/or a second application-defined framework 480, comprising application-defined classes and class attributes. For example, as mentioned previously, the programmer of the mobile application may create an application library or first application-defined framework 470 that includes unique classes and/or attributes for the mobile application.

The classloaders shown in FIG. 4 may be a hierarchy of classloaders. For example, the second application-defined classloader 450 may have a parent classloader, first application-defined classloader 440. The first application-defined classloader 440 may have a parent classloader, the application classloader 430, and a child classloader, the second application-defined classloader 450. The application classloader 430 may have a parent classloader, the operating system classloader 420, and a child classloader, the first application-defined classloader 440. Finally, the operating system classloader 420 may have a parent classloader, JAVA classloader 410, and a child classloader, the application classloader 430.

In some instances, the JAVA classloader 410 may reference a JAVA library (e.g., JAVA framework) that comprises JAVA defined classes and class attributes. The operating system classloader 420 may reference an operating system library (e.g., operating system framework) that comprises operating system defined classes and class attributes. Further, the application classloader 430 may reference a default application library (e.g., default application framework 460) that includes default application classes and class attributes.

Referring back to FIG. 3, after receiving the request for a class, at step 320, the user device may forward the request up the hierarchy of classloaders. For example, the user device may start with the second application-defined classloader 450. But, even if the class is located in the second application-defined framework 480, the user device may forward the request up the hierarchy of classloaders to the parent of the second application-defined classloader 450, the first application-defined classloader 440. Then, the user device may continue to forward the request up the hierarchy until the request reaches the JAVA classloader 410.

At step 330, the user device may determine whether the class has been found by the classloader. For example, initially, the user device may use the JAVA classloader 410 to determine whether the requested class is a JAVA defined class (e.g., the top classloader in the hierarchy). In some examples, the requested class may be a JAVA defined class, and the method 300 may move to step 340. At step 340, the user device may retrieve the JAVA defined class, including the class attributes, from the default application framework 460. Then, after retrieving the class, the user device may use the retrieved class for the mobile application.

In some embodiments, the requested class might not be a JAVA defined class and the method may move to step 350. At step 350, the JAVA classloader may return a no class found exception. The no class found exception may indicate that the requested class is not a JAVA defined class. After returning the no class found exception, at step 360, the user device may move down a classloader in the hierarchy (e.g., the operating system classloader) and the method 300 may return to step 330. The method may repeat for the other classloaders in the hierarchy shown in FIG. 4 until the requested class has been found in a library.

In some instances, the requested class may be located in the second application-defined framework 480. However, from method 300, prior to retrieving the class from the second application-defined framework 480, the user device may use the classloaders above the second application-defined classloader 450 in the hierarchy. Thus, the user device may use the JAVA classloader 410, the operating system classloader 420, the application classloader 430, and the first application-defined classloader 440 prior to using the second application-defined classloader.

Enterprise Mobility Management Architecture

Figure 5:
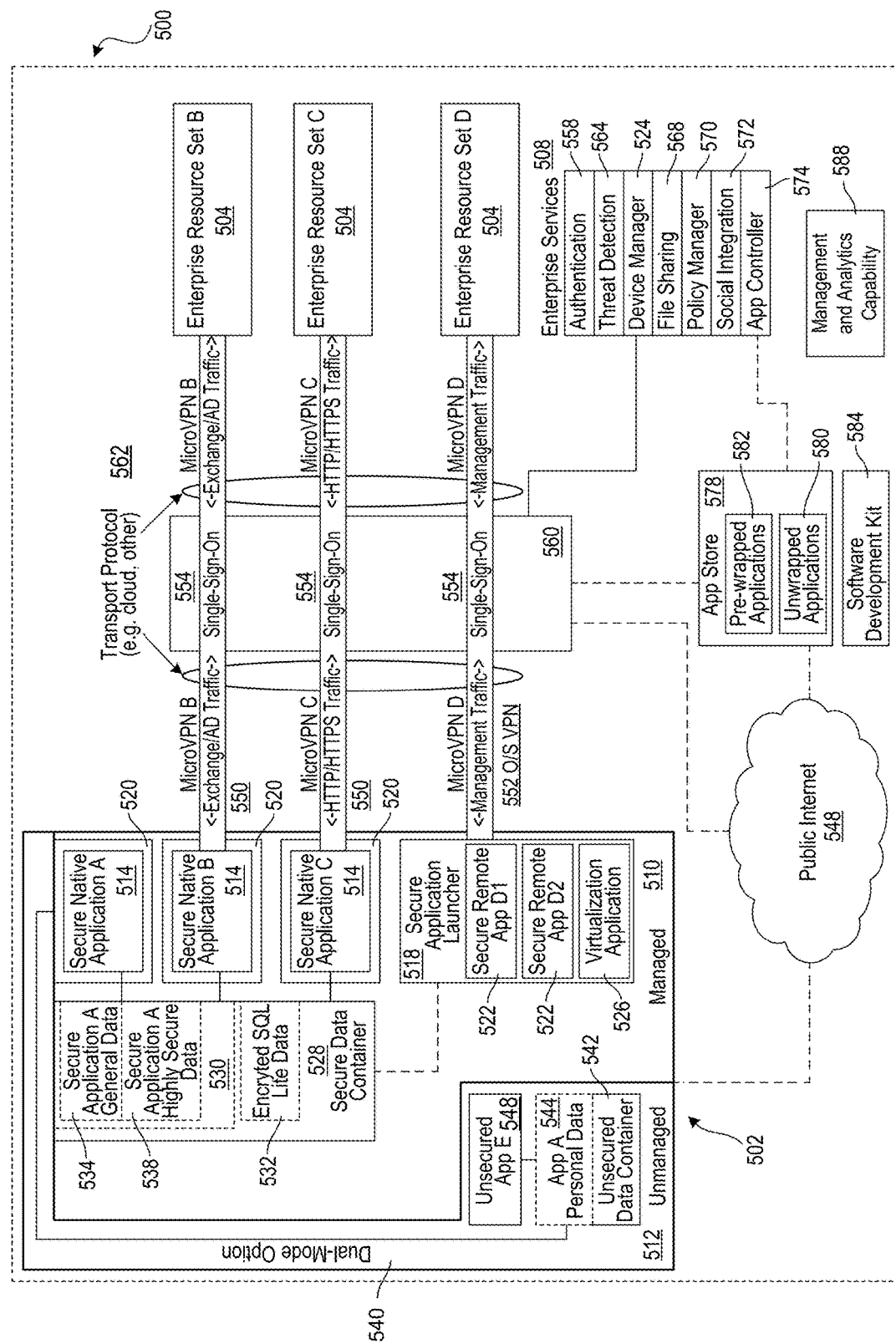
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is impenetrable by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications 550, particular devices, particular secured areas on the mobile device 552, and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like.

How often resources are used may include how often an application has been downloaded, how many times a specific set of data has been accessed by an application, and the like.

Figure 6:
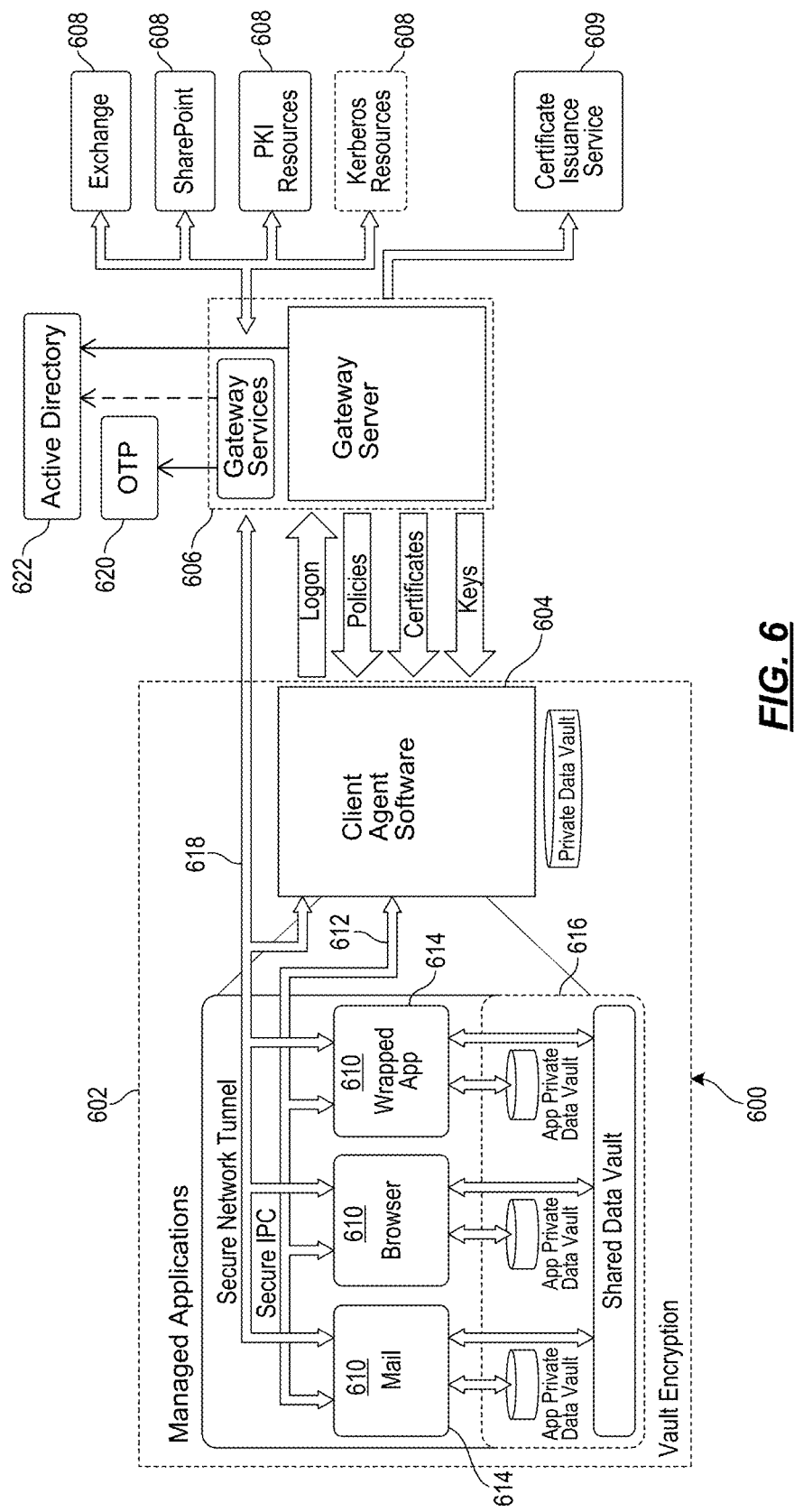
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (also known as NETSCALER ACCESS GATEWAY). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected.

For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when HTTP (but not HTTPS) connections are proxied in VPN and MicroVPN mode.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Accessing Conflicting Frameworks and Classes

Figure 7:
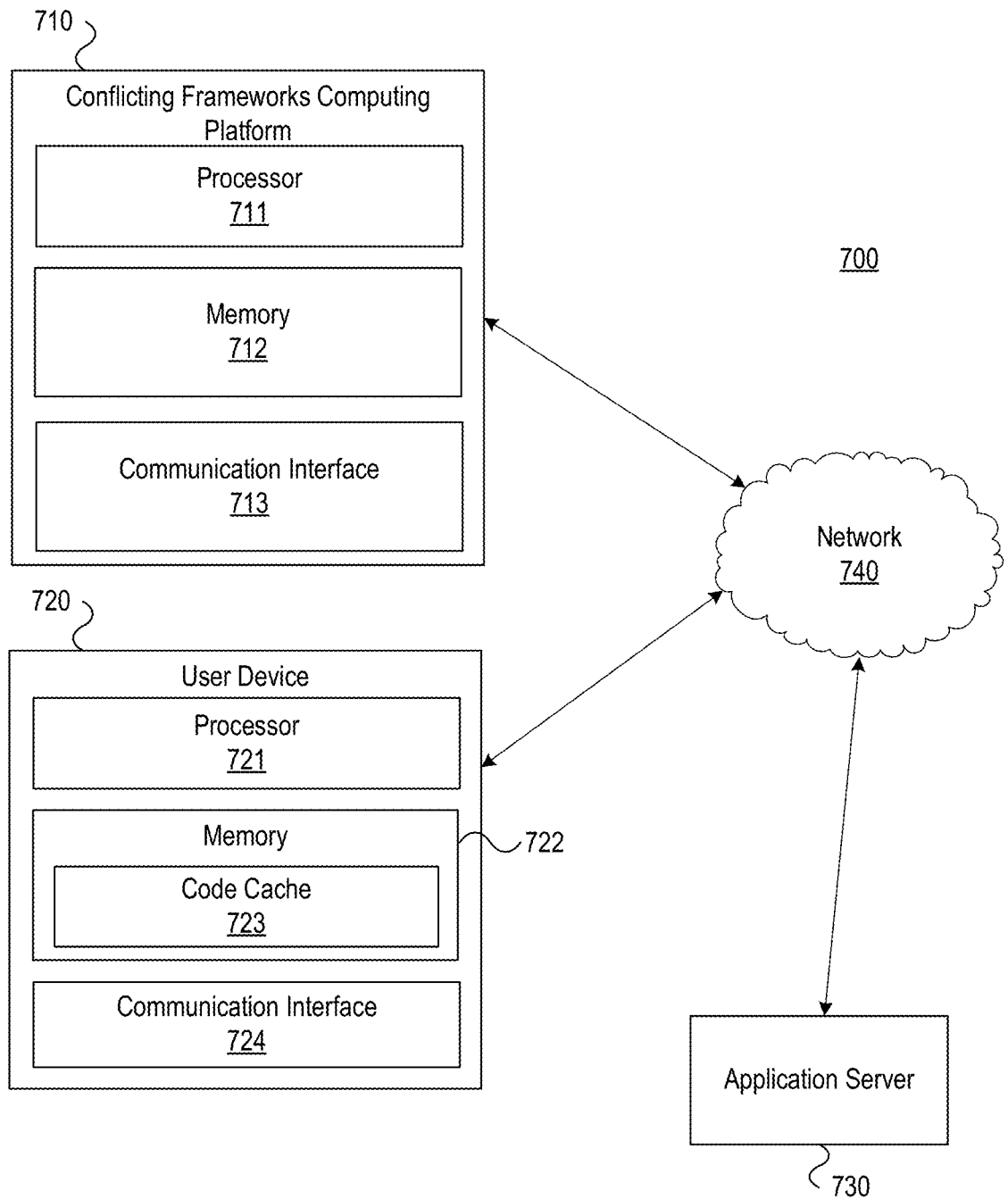
FIG. 7 depicts an illustrative computing environment for accessing conflicting frameworks and classes in accordance with one or more illustrative aspects described herein.

FIG. 7 depicts an illustrative computing environment for accessing conflicting frameworks and classes in accordance with one or more illustrative aspects described herein. Referring to FIG. 7, computing environment 700 may include a conflicting frameworks computing platform 710, a user device 720, an application server 730, and a network 740. Conflicting frameworks computing platform 710, user device 720, and application server 730 may include one or more physical components, such as one or more processors, memories, communication interfaces, and/or the like.

Conflicting frameworks computing platform 710 may include one or more processor(s) 711, memory 712, and communication interface 713. For example, processor 711 may execute instructions stored in memory 712 to cause the conflicting frameworks computing platform 710 to perform one or more functions, such as accessing conflicting frameworks and/or classes. Communication interface 713 may include one or more network interfaces via which the conflicting frameworks computing platform 710 may communicate with one or more other systems and/or devices in computing environment 700, such as the user device 720 and the application server 730. The conflicting frameworks computing platform 710 may create and/or provide libraries and/or frameworks for one or more mobile applications as described below. The libraries and/or frameworks may include conflicting versions of classes and/or class attributes. In addition, the conflicting frameworks computing platform 710 may create and/or provide one or more classloaders, including a framework-termination classloader and/or a framework-defined classloader, as described below.

In some instances, the conflicting frameworks computing platform 710 may incorporate one or more aspects of the enterprise mobility management system described in FIG. 5 and/or FIG. 6. For example, the conflicting frameworks computing platform 710 may wrap mobile applications. As described above, by wrapping mobile applications, the conflicting frameworks computing platform 710 may include and/or implement policies to manage a user device, such as user device 720. By operating in accordance with their respective policy file(s), each application may be allowed or restricted from communications with one or more other applications and/or resources.

User device 720 may be a mobile device 502 and/or a client device (e.g., client device 107). For example, from user device 720, a user may use a mobile application, such as a wrapped application. Additionally, in some instances, the user device 720 may include one or more processor(s) 721, memory 722, code cache 723, and communication interface 724. For example, processor 721 may execute instructions stored in memory 722 to cause the user device to perform one or more functions, such as accessing conflicting frameworks and/or classes. Communication interface 724 may include one or more network interfaces via which the user device 720 may communicate with one or more other systems and/or devices in computing environment 700, such as the conflicting frameworks computing platform 710 and the application server 730.

In some instances, the user device 720 may initiate a mobile application, including initiating libraries and/or frameworks corresponding to the mobile application. Further, the user device 720 may retrieve classes and/or class attributes using a classloader, such as a JAVA classloader, an operating system classloader, an application classloader, one or more application-defined classloaders, and/or framework-defined classloaders as described below.

Application server 730 may incorporate one or more aspects of server 206. For example, as explained above, application server 730 may provide mobile applications, including third-party mobile applications, to the conflicting frameworks computing platform 710 and/or the user device 720.

Network 740 may include one or more wide area networks and/or local area networks and may interconnect one or more systems and/or devices included in computing environment 700. For example, network 740 may interconnect the conflicting frameworks computing platform 710, the user device 720, and the application server 730.

Figure 8A:
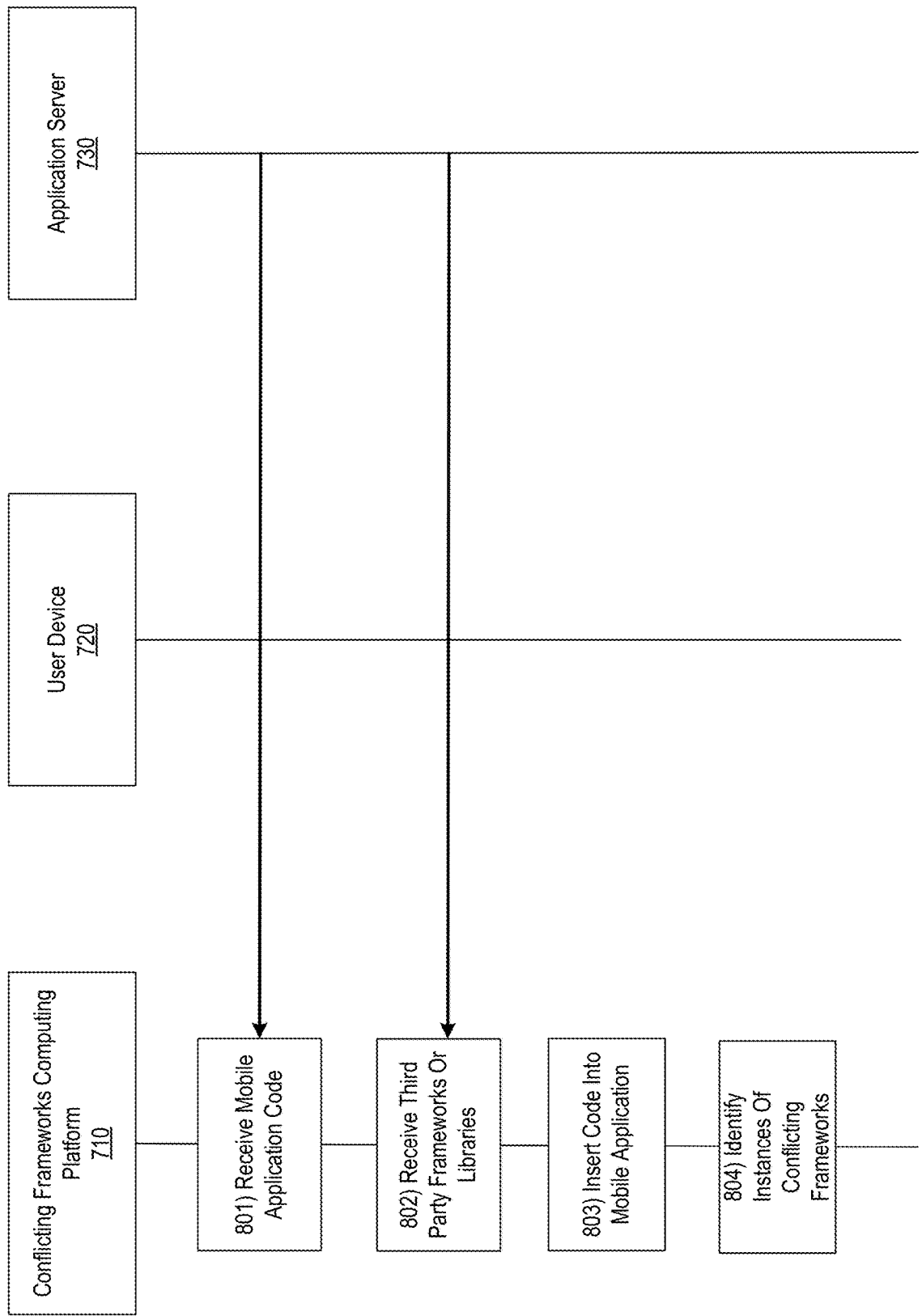

FIG. 8A-8D depict an example event sequence for accessing conflicting frameworks and classes in accordance with one or more illustrative aspects described herein. Referring to FIG. 8A, at step 801, the conflicting frameworks computing platform 710 may receive, from the application server 730, mobile application code corresponding to a mobile application. For example, the application server 730 may store mobile applications, including source code for the mobile applications. The application server 730 may send, to the conflicting frameworks computing platform 710, the mobile application source code. In some instances, a third party may program and/or manage the mobile application. For example, the mobile application may be from a third party developer.

At step 802, the conflicting frameworks computing platform 710 may receive, from the application server 730, third party frameworks and/or libraries. As mentioned previously, the third party frameworks and/or libraries may comprise classes and/or class attributes used by the mobile application. For example, the application server 730 may store and/or send the third party frameworks and/or libraries, such as the default application framework 460 and/or one or more application-defined frameworks (e.g., the first application-defined framework 470 and/or the second application-defined framework 480). The third party frameworks and/or libraries may be stored as JAVA Archive (.jar) files. In some examples, the third party may provide and/or create the one or more third party frameworks and/or libraries. In some embodiments, the application server 730 may send a mobile application package comprising the mobile application source code and the third party frameworks and/or libraries. The third party frameworks and/or libraries may be stored in an "Assets" folder of the mobile application package.

At step 803, the conflicting frameworks computing platform 710 may insert code into the mobile application. For example, the conflicting frameworks computing platform 710 may insert code, such as application wrapping code, into the mobile application. The application wrapping code may wrap the mobile application. For instance, the application wrapping code may include and/or implement policies files as described above.

Furthermore, the application wrapping code may reference one or more additional libraries and/or frameworks. The one or more additional libraries and/or frameworks may include classes and/or class attributes that are unique to the application wrapping code. In some instances, however, the application wrapping code may reference one or libraries and/or frameworks that conflicts with one or more third party libraries and/or frameworks. For example, the mobile application source code may reference one version of a library, such as a version 2.2.4 GSON library, and the application wrapping code may reference another version of the library, such as a version 2.8 GSON library. User device 720, during run-time of the mobile application, may retrieve a class from one version of the library, such as version 2.2.4 GSON library. However, the application wrapping code may be programmed to run with a class from version 2.8 of the GSON library. By retrieving the class from a conflicting third-party library and/or framework, the application wrapping code may fail during run-time. Additionally, in some examples, the mobile application may crash. As such, the conflicting frameworks computing platform 710 may create new classloaders to resolve the issue of conflicting frameworks and/or classes as described below.

At step 804, the conflicting frameworks computing platform 710 may identify instances of conflicting frameworks. For example, after receiving third party frameworks and/or libraries at step 802, the conflicting frameworks computing platform 710 may identify, from the third party frameworks and/or libraries, conflicting libraries and/or frameworks. As mentioned previously, the mobile application source code may reference one version of a library, such as a version 2.2.4 GSON library, and the application wrapping code may reference another version of the library, such as a version 2.8 GSON library. The conflicting frameworks computing platform 710 may identify instances of conflicting and/or versions of frameworks and/or libraries used by the mobile application source code and the application wrapping code.

Figure 8B:
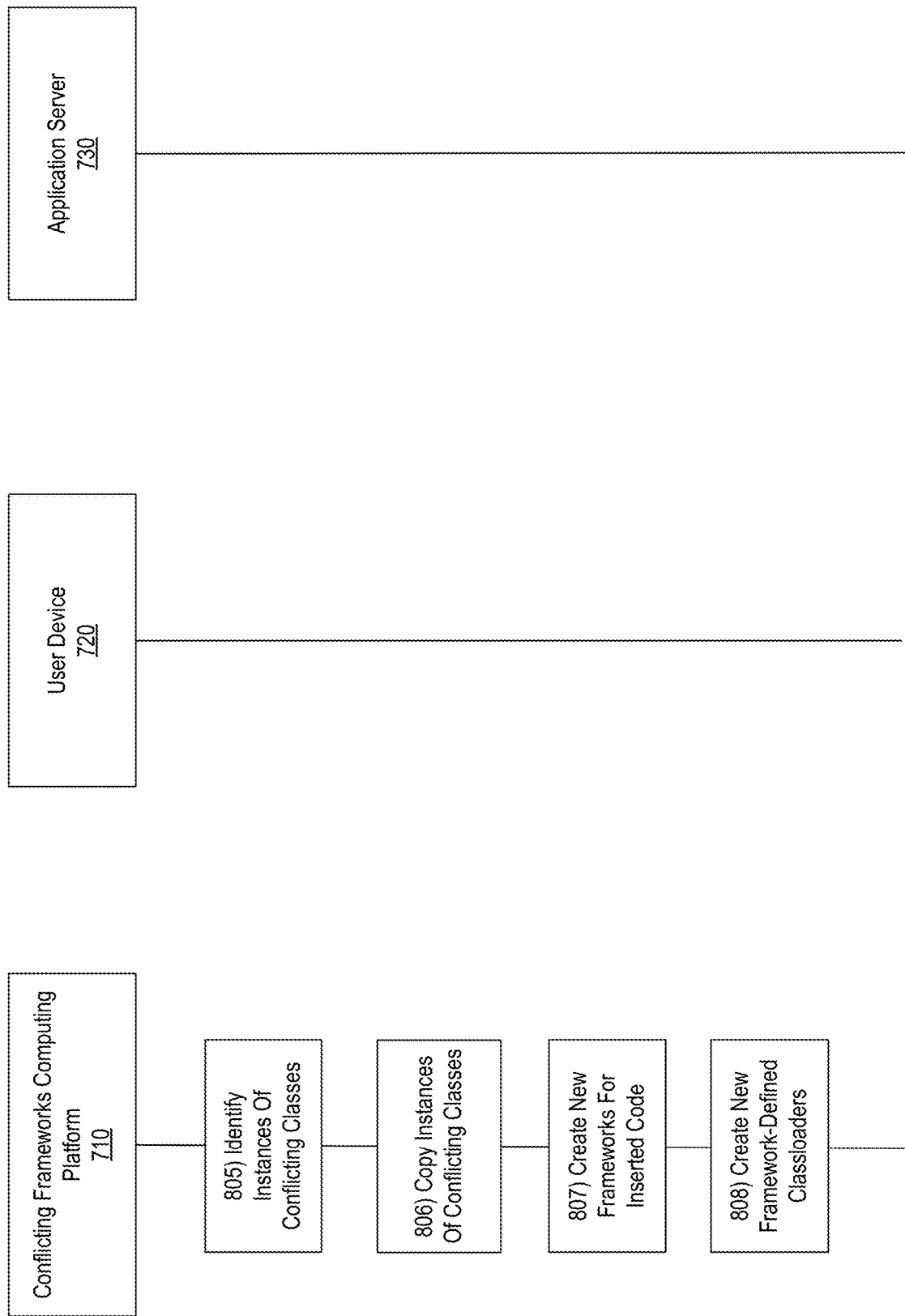

Referring to FIG. 8B, at step 805, the conflicting frameworks computing platform 710 may identify instances of conflicting classes. For example, the conflicting frameworks computing platform 710 may identify, from the identified conflicting frameworks and/or libraries at step 804, conflicting classes and/or class attributes. For instance, the conflicting frameworks computing platform 710 may identify a class that conflicts between version 2.2.4 of the GSON library and version 2.8 of the GSON library. In some instances, some of the classes in the different versions of the frameworks might not be conflicting. For instance, a class in version 2.2.4 of the GSON library may be identical to the class in version 2.8 of the GSON library. As such, regardless of the library that the user device retrieves the class, the mobile application code might not run into problems during run-time. Thus, the conflicting frameworks computing platform 710 may parse through the identified conflicting frameworks and identify conflicting classes within the frameworks.

In some examples, the conflicting frameworks computing platform 710 may identify a conflicting class from a non-conflicting framework. For example, a class name referenced by the application wrapping code may match a class name from a non-conflicting framework (e.g., a framework not identified at step 204). The conflicting frameworks computing platform 710, at step 205, may identify the conflicting class from a non-conflicting framework.

At step 806, the conflicting frameworks computing platform 710 may copy instances of the conflicting classes. For example, after identifying instances of the conflicting classes at step 805, the conflicting frameworks computing platform 710 may copy the instances of the conflicting classes, including the class attributes corresponding to the conflicting classes. The copied instances of the conflicting classes may be from the library and/or framework referenced by the inserted code (e.g., the application wrapping code). For example, after identifying that a class conflicts within version 2.2.4 version of the GSON library and version 2.8 of the GSON library, the conflicting frameworks computing platform 710 may copy an instance of the class referenced by the application wrapping code (e.g., version 2.8 of the GSON library).

In some instances, when copying instances of the classes, the conflicting frameworks computing platform 710 may re-name a copied class. For example, the conflicting frameworks computing platform 710 may identify the conflicting class as "some.framework.Class." When copying an instance of that class, the conflicting frameworks computing platform 710 may re-name the class to "applicationwrapping.some.framework.Class."

At step 807, the conflicting frameworks computing platform 710 may create new frameworks for the inserted code (e.g., the application wrapping code). For example, the conflicting frameworks computing platform 710 may create one or more new frameworks and/or libraries comprising the copied instances of the conflicting classes at step 806. The new frameworks and/or libraries may include identified conflicting classes within the mobile application source code and the inserted code (e.g., the application wrapping code).

In some examples, the conflicting frameworks computing platform 710 may copy and/or create a conflicting framework identified at step 804. For example, even though a version of a conflicting framework may include classes that are not conflicting, the conflicting frameworks computing platform 710 may copy and/or create a new framework from the version of the conflicting framework accessed by the application wrapping code.

At step 808, the conflicting frameworks computing platform 710 may create new framework-defined classloaders. After creating the one or more new frameworks and/or libraries for the inserted code (e.g., the application wrapping code), the conflicting frameworks computing platform 710 may create one or more classloaders that references the new frameworks and/or libraries.

In some embodiments, when the application wrapping code references the one or more new framework-defined classloaders, a user device, such as user device 720, may retrieve the classes, including the class attributes, from the new frameworks and/or libraries created at step 807 rather than from the original application-defined frameworks (e.g., the default application framework 460, the first application-defined framework 470, and/or the second application-defined framework 480). Thus, by retrieving classes from the new frameworks and/or libraries, the application wrapping code may avoid retrieving conflicting versions of classes that may cause the mobile application to crash.

Figure 8C:
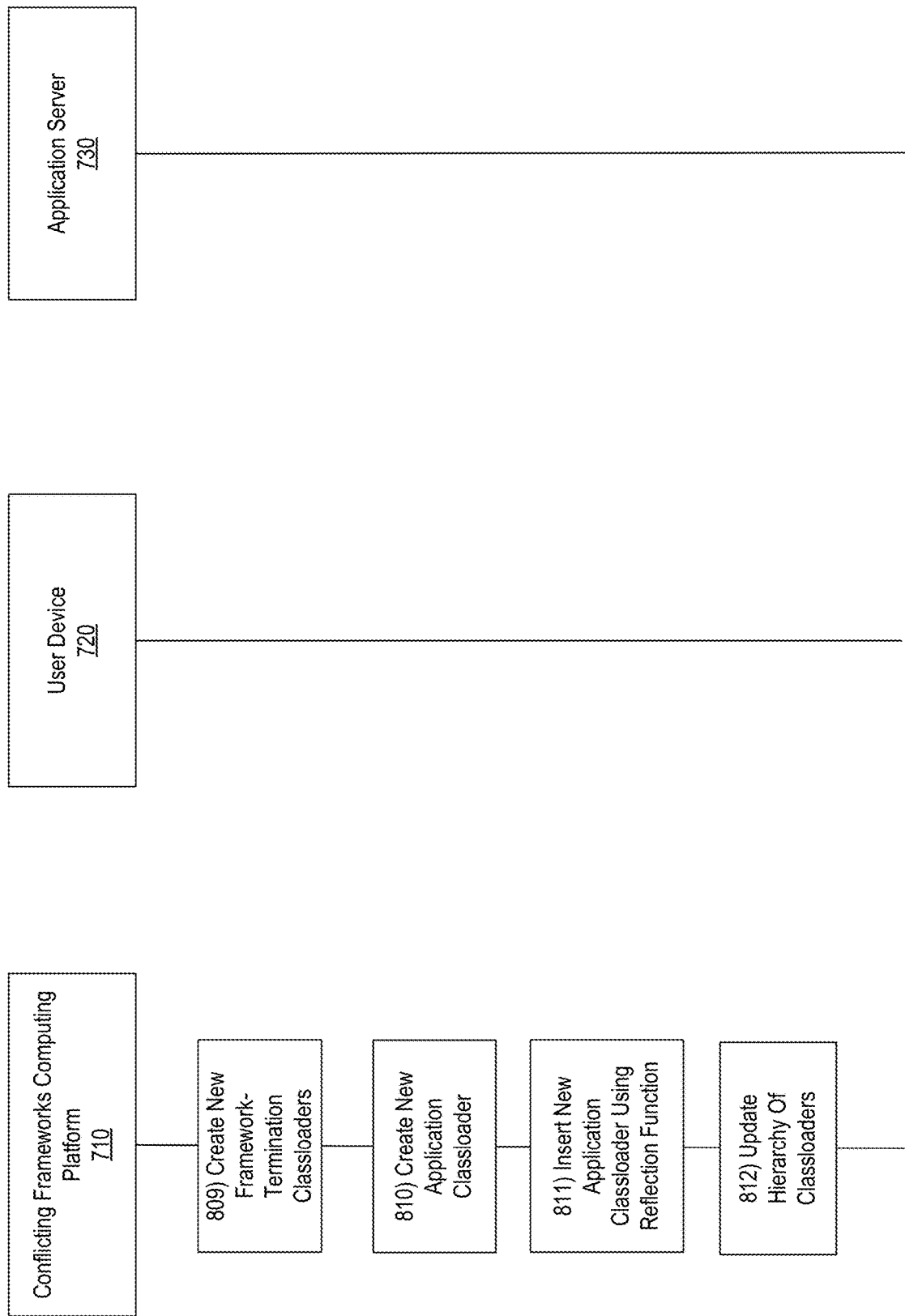

Referring to FIG. 8C, at step 809, the conflicting frameworks computing platform 710 may create new framework-termination classloaders. For example, after creating one or more new framework-defined classloaders, the conflicting frameworks computing platform 710 may create one or more new framework-termination classloaders. The framework-termination classloaders may be a parent classloader to the new framework-defined classloaders created at step 808. Additionally, the framework-termination classloader may be a child classloader of an application classloader, such as the application classloader 430.

Further, rather than forwarding the request up the classloader hierarchy, the framework-termination classloader may return a no class found exception when called. For example, referring back to FIG. 3, the mobile application may request a class from a library. Then, after the new framework-defined classloader forwards the request to a parent classloader, the framework-termination classloader, the framework-termination classloader might not forward the request to its parent classloader (e.g., the application classloader 430) as shown at step 320. Rather, the framework-termination classloader may return a no class found exception shown at step 350, and the mobile application may move down a classloader in the hierarchy (e.g., the new framework-defined classloader), and retrieve the requested class from the framework-defined classloader.

At step 810, the conflicting frameworks computing platform 710 may create a new application classloader. For example, the conflicting frameworks computing platform 710 may create a new application classloader for the mobile application. The new application classloader may be aware of the one or more new framework-defined classloaders created at step 808.

For instance, application classloader 430 may be aware of the third party frameworks and/or libraries corresponding to the mobile application source code (e.g., the default application framework 460, the first application-defined framework 470, and/or the second application-defined framework 480). Therefore, when an operating system, such as the operating system of the user device 720, requests a class, the application classloader 430 may be able to retrieve the class from the third party frameworks and/or libraries (e.g., the default application framework 460, the first application-defined framework 470, and/or the second application-defined framework 480). However, the application classloader 430 might not be aware of the new frameworks and/or libraries created at step 808. Therefore, when the operating system for user device 720 requests a class from the new frameworks and/or libraries, the application classloader 430 might not be aware and/or able to retrieve the class from the new frameworks and/or libraries. The conflicting frameworks computing platform 710, at step 810, may create a new application classloader that may be aware and/or able to retrieve classes from the third party frameworks and/or libraries and also the new frameworks and/or libraries created at step 808.

At step 811, the conflicting frameworks computing platform 710 may insert the new application classloader using a reflection function. For example, the conflicting frameworks computing platform 710 may replace or hook, using a reflection function (e.g., a JAVA reflection function), the application classloader 430 with the new application classloader created at step 810. By using JAVA reflection, user device 720, during run-time of the mobile application, may be able to inspect the classes called or requested by the mobile application source code or the inserted code (e.g., the application wrapping code).

In some instances, the request may be for a class in the one of the new frameworks and/or libraries. By using JAVA reflection and/or the new application classloader, the user device 720 may be able to inspect the requested class and determine that the requested class is located in one of the new frameworks and/or libraries. Then, the user device 720 may forward the request to the new framework-defined classloaders. In some embodiments, the request may be for a class in one of the third party frameworks and/or libraries. By using JAVA reflection and/or the new application classloader, the user device 720 may be able to inspect the requested class and determine that the requested class is located in one of the third party frameworks and/or libraries. Then, the user device 720 may forward the request to the original application classloader (e.g., application classloader 430) to process the request.

At step 812, the conflicting frameworks computing platform 710 may update the hierarchy of classloaders. For example, the classloaders may be stored in an "Assets" folder of the mobile application. The conflicting frameworks computing platform 710 may update, in the "Assets" folder of the mobile application, the hierarchy of classloaders, including the framework-defined classloader, the framework-termination classloader, and/or the new application classloader. For instance, the new hierarchy of classloaders may be shown in FIG. 9.

Figure 9:
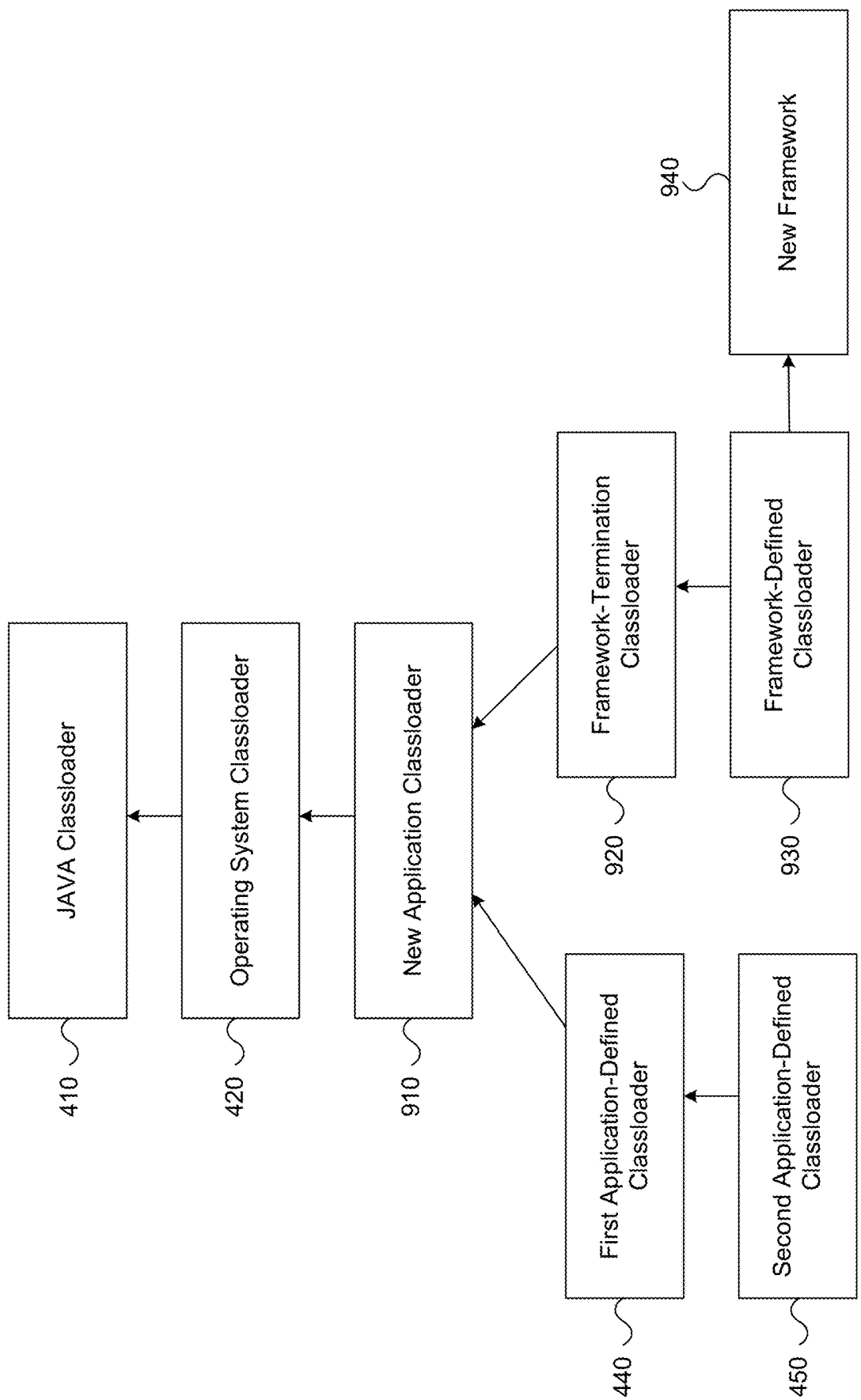
FIG. 9 depicts another example classloader hierarchy for accessing conflicting frameworks and classes in accordance with one or more illustrative aspects described herein.

FIG. 9 depicts another example classloader hierarchy for accessing conflicting frameworks and classes in accordance with one or more illustrative aspects described herein. Referring to FIG. 9, the JAVA classloader 410, the operating system classloader 420, the first application-defined classloader 440, and the second application-defined classloader 450 might not be updated, and may function as described in FIG. 4. New application classloader 910 may be the new application classloader created at step 810. Framework-termination classloader 920 may be one of the framework-termination classloaders created at step 809. Framework-defined classloader 930 may be one of the new framework-defined classloaders created at step 808. New framework 940 may be one of the frameworks and/or libraries created at step 807.

Referring to FIG. 8D, at step 813, the conflicting frameworks computing platform 710 may transmit the mobile application with the inserted code to the user device 720. For example, the conflicting frameworks computing platform 710 may transmit, to the user device 720, the mobile application, including the source code, the inserted code (e.g., the application wrapping code), the updated hierarchy of classloaders described at step 812, the third party frameworks and/or libraries, and/or the new frameworks and/or libraries at step 807.

In some embodiments, the application server 730 may transmit an unwrapped mobile application (e.g., the mobile application source code and/or the third party frameworks and/or libraries) to the user device 720. Further, the conflicting frameworks computing platform 710 may transmit the application wrapping code, the termination-defined classloaders, the framework-defined classloaders, and/or the new frameworks and/or libraries. After receiving the information, the user device 720 may wrap the application using the application wrapping code. Additionally, the user device 720 may insert the new application classloader using JAVA reflection and/or update the hierarchy of classloaders as mentioned above.

At step 814, the user device 720 may initialize the mobile application. For example, the user device 720 may load resources required to run the mobile application. In some instances, by initializing the mobile application, the user device 720 may retrieve the third party frameworks and/or libraries, which the mobile application source code may reference. After retrieving the third party frameworks and/or libraries, the user device 720 may store the third party frameworks and/or libraries in the code cache. Then, when the mobile application requests a class, the user device 720 may retrieve and/or load the requested class from the third party frameworks and/or libraries in the code cache.

At step 815, the user device 720 may access the new application classloader to retrieve a requested class. For example, the operating system of user device 720 may request a class for the mobile application by using a classloader function. The classloader function may reference the application classloader 430. However, rather than using the application classloader 430, the user device 720 may use the new application classloader 910 to retrieve the requested class. For instance, as described at step 811, using JAVA reflection, the new application classloader 910 may replace or hook the application classloader 430. The new application classloader 910 may determine whether the requested class may be a class in one of the new frameworks or in one of the third party frameworks.

In some instances, by using JAVA reflection and/or the new application classloader, the user device 720 may be able to inspect the requested class and determine that the requested class is located in one of the new frameworks and/or libraries. The user device 720 may then forward the request to the new framework-defined classloaders (e.g., framework-defined classloader 930). In some embodiments, by using JAVA reflection and/or the new application classloader, the user device 720 may be able to inspect the requested class and determine that the requested class is located in one of the third party frameworks and/or libraries. The user device 720 may then forward the request to the original application classloader (e.g., application classloader 430).

Figure 10:
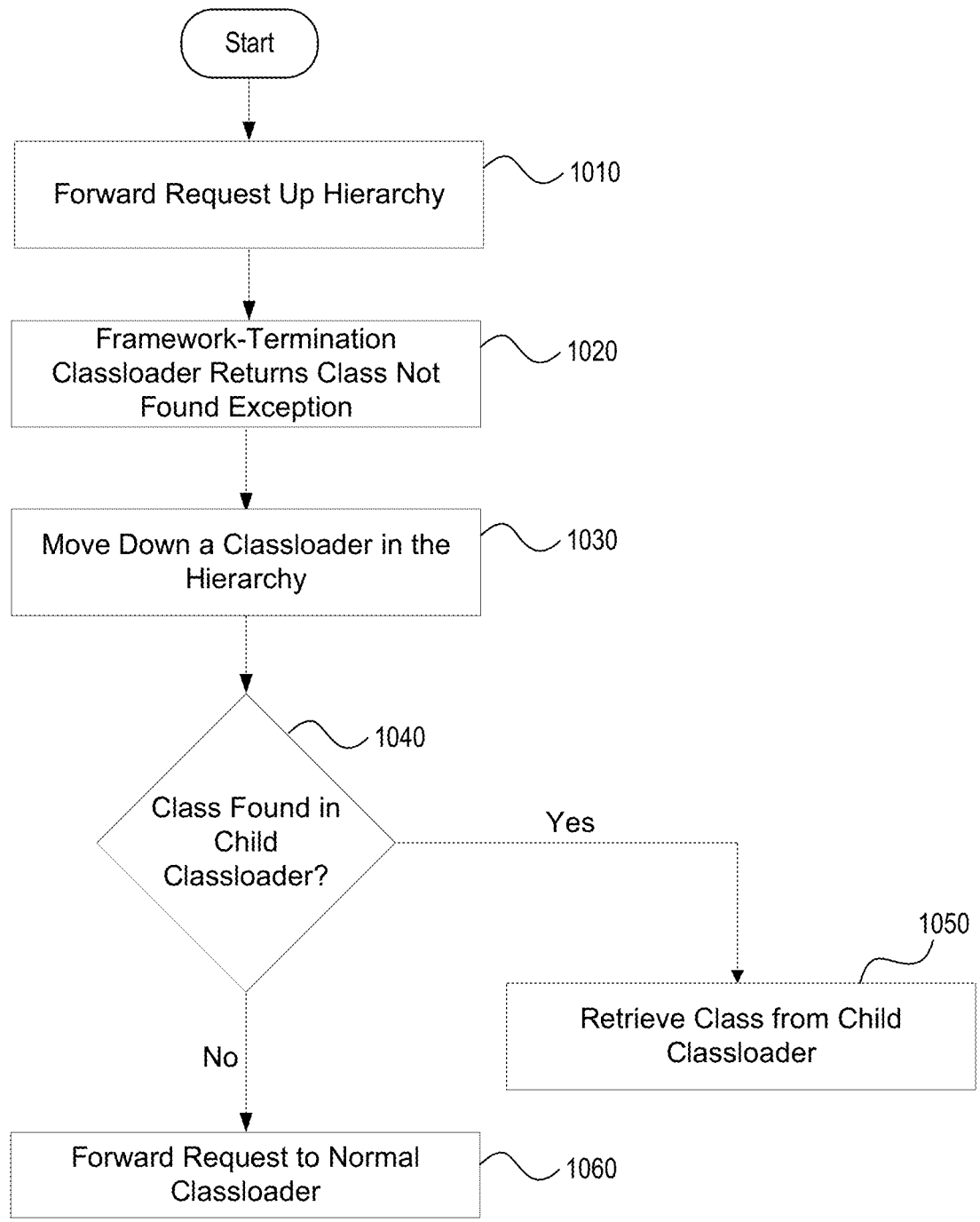
FIG. 10 depicts another example classloader hierarchy method for accessing conflicting frameworks and classes in accordance with one or more illustrative aspects described herein.

At step 816, the user device 720 may retrieve the requested class using a classloader. For example, after determining the requested class is in one of the new frameworks, the user device 720 may retrieve the requested class using a classloader, such as the framework-defined classloader 930. FIG. 10 may depict an example method for retrieving the requested class using the framework-defined classloader 930. Referring to FIG. 10, at step 1010, the user device 720 may forward the request up the hierarchy. The user device 720 may forward the request up the hierarchy of classloaders similar to step 320 described above. For instance, the user device 720 may forward the request to the parent of the framework-defined classloader 930 (e.g., framework-termination classloader 920).

At step 1020, the framework-termination classloader 920 may return a class not found exception. For example, rather than the framework-termination classloader 920 forwarding the request up the hierarchy further (e.g., forwarding to the new application classloader 910), the framework-termination classloader 920 may return a class not found exception.

At step 1030, after returning the class not found exception, the user device 720 may move down a classloader in the hierarchy. For example, the user device 720 may move down a classloader in the hierarchy, to the framework-defined classloader 930.

At step 1040, the user device 720 may determine whether the class is found in the child classloader (e.g., the framework-defined classloader 930). If the class is found in the child classloader (e.g., the framework-defined classloader 930), the method may move to step 1050. If not, then the method may move to step 1060.

At step 1050, the user device 720 may retrieve the class from the child classloader (e.g., the framework-defined classloader 930). In some examples, since another version of the class (e.g., a conflicting version of the class) may have been already loaded by the user device 720, by forwarding the request up the hierarchy to the new application classloader 910, the user device 720 may retrieve the already loaded class. However, based on the framework-termination classloader returning a class not found exception, the user device 720 may search for the class first in the child classloader (e.g., the framework-defined classloader 930). If the user device 720 finds the class in the child classloader (e.g., the framework-defined classloader 930), the user device 720 may retrieve the class from the new framework 940.

At step 1060, the user device 720 may forward the request to the normal classloader (e.g., the application classloader 430). For example, the user device 720 might not find the requested class in the framework-defined classloader 930. In such examples, the user device 720 may forward the request to the application classloader 430, and retrieve the class as described in FIG. 3.

Figure 11:
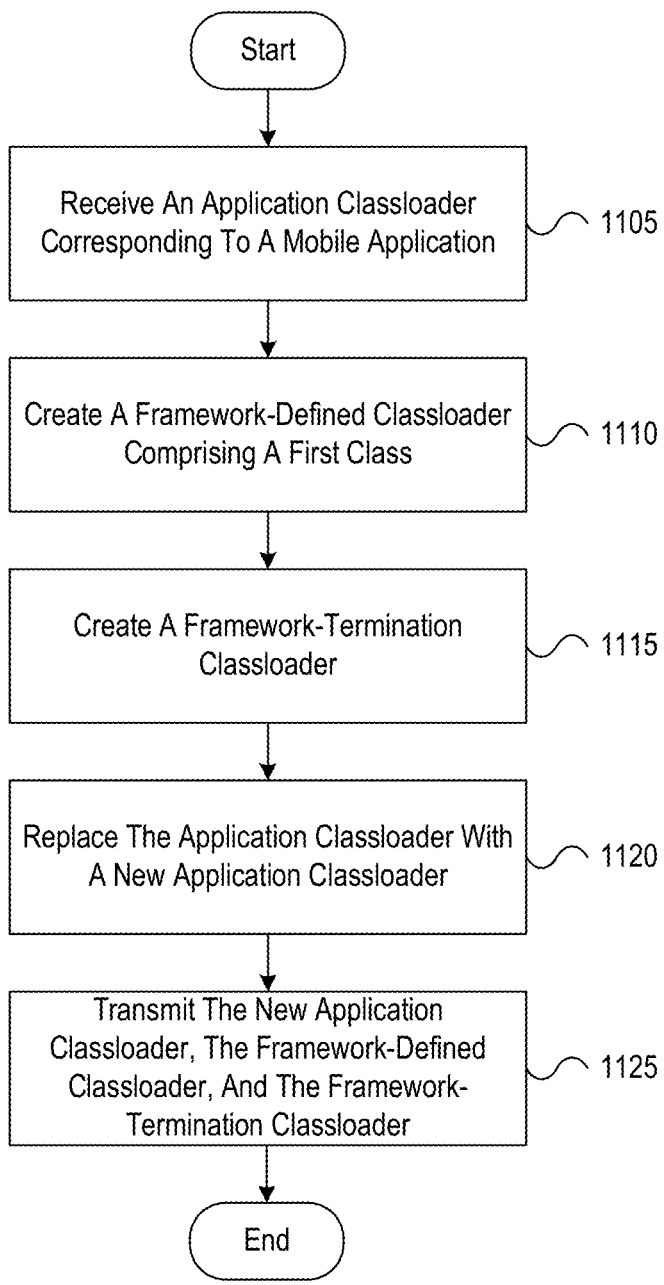
FIG. 11 depicts an example method of accessing conflicting frameworks and classes in accordance with one or more illustrative aspects described herein.

FIG. 11 depicts an example method of accessing conflicting frameworks and classes in accordance with one or more illustrative aspects described herein. Referring to FIG. 11, at step 1105, a conflicting frameworks computing platform having at least one processor, a communication interface, and a memory may receive an application classloader corresponding to a mobile application, wherein the application classloader indicates one or more child application-defined classloaders. At step 1110, the conflicting frameworks computing platform may create a framework-defined classloader comprising a first class that conflicts with a second class in the one or more child application-defined classloaders. At step 1115, the conflicting frameworks computing platform may create a framework-termination classloader, wherein the framework-termination classloader is a parent classloader of the framework-defined classloader. At step 1120, the conflicting frameworks computing platform may replace, using a reflection function, the application classloader with a new application classloader, wherein the new application classloader indicates the one or more child application-defined classloaders, the framework-defined classloader, and the framework-termination classloader. At step 1125, the conflicting frameworks computing platform may transmit, via the communication interface and to a user device, the new application classloader, the framework-defined classloader, and the framework-termination classloader.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
at a computing platform comprising at least one processor, memory, and a communication interface:
receiving, by the at least one processor, an application classloader corresponding to a mobile application, wherein the application classloader indicates one or more child application-defined classloaders;
creating, by the at least one processor, a framework-defined classloader comprising a first class that conflicts with a second class in the one or more child application-defined classloaders;
creating, by the at least one processor, a framework-termination classloader, wherein the framework-termination classloader is a parent classloader of the framework-defined classloader;
replacing, by the at least one processor and using a reflection function, the application classloader with a new application classloader, wherein the new application classloader is a parent classloader of the framework-termination classloader, wherein the new application classloader is configured to send, to one of the application classloader or the framework-defined classloader, a request for a requested class, and wherein the framework-defined classloader is configured to, in response to the framework-defined classloader receiving the request for the requested class from the new application classloader, send the request for the requested class to the framework-termination classloader; and
transmitting, by the at least one processor, via the communication interface, and to a user device, the new application classloader, the framework-defined classloader, and the framework-termination classloader.

2. The method of claim 1, further comprising:
inserting, by the at least one processor, application wrapping code into source code of the mobile application, wherein the source code corresponds to the second class, and wherein the application wrapping code corresponds to the first class that conflicts with the second class.

3. The method of claim 2, wherein the first class and the second class are different, incompatible versions of a same class, and wherein the first class and the second class comprise a same class name.

4. The method of claim 1, wherein the one or more child application-defined classloaders indicate one or more third-party libraries comprising a plurality of classes, and wherein the method further comprises:
identifying, by the at least one processor and from the plurality of classes, the second class; and
identifying, by the at least one processor and based on the second class, the first class.

5. The method of claim 4, further comprising:
creating, by the at least one processor, a framework library comprising the first class; and
linking, by the at least one processor, the framework-defined classloader to the framework library.

6. The method of claim 1, further comprising:
defining, by the at least one processor, a hierarchy of classloaders corresponding to the mobile application, wherein the hierarchy of classloaders comprises the application classloader and the one or more child application-defined classloaders; and
inserting, by the at least one processor and in the hierarchy of classloaders, the framework-termination classloader, wherein the framework-termination classloader is a child classloader of the application classloader.

7. The method of claim 6, wherein the replacing the application classloader with the new application classloader comprises replacing the application classloader in the hierarchy of classloaders using the reflection function.

8. The method of claim 1, wherein the framework-defined classloader indicates a framework library comprising the first class, wherein the application classloader indicates a third-party library comprising the second class, wherein the framework-defined classloader is a child classloader to the application classloader, and wherein the method further comprises:
receiving the request for the requested class, wherein the requested class comprises a same class name as the first class and the second class;
forwarding the request to the framework-defined classloader; and
retrieving the requested class from the framework library.

9. The method of claim 8, further comprising:
forwarding the request to the framework-termination classloader; and
in response to forwarding the request to the framework-termination classloader, receiving a class not found exception;
wherein the retrieving the requested class from the framework library is based on the class not found exception.

10. The method of claim 8, wherein the forwarding the request to the framework-defined classloader is in response to determining, based on the new application classloader, that the requested class is for the first class.

11. The method of claim 8, further comprising:
in response to determining, based on the new application classloader, that the requested class is for the second class, forwarding the request to the application classloader.

12. The method of claim 1, wherein the framework-termination classloader is configured to, in response to receiving the request for the requested class from the framework-defined classloader:
indicate that the requested class is not found; and
send the request for the requested class to the framework-defined classloader.

13. The method of claim 1, wherein the framework-defined classloader is configured to, in response to the requested class not being found by the framework-defined classloader, send the request for the requested class to the application classloader.

14. The method of claim 1, wherein the new application classloader is configured to, based on determining whether the requested class is located in a framework associated with the framework-defined classloader or in a framework associated with the application classloader, determine whether to send the request for the requested class to the framework-defined classloader or the application classloader.

15. A computing platform comprising:
at least one processor;
a communication interface communicatively coupled to the at least one processor; and memory storing computer-readable instructions that, when executed by the at least one processor, cause the computing platform to:
- receive, by the at least one processor, an application classloader corresponding to a mobile application, wherein the application classloader indicates one or more child application-defined classloaders;
- create, by the at least one processor, a framework-defined classloader comprising a first class that conflicts with a second class in the one or more child application-defined classloaders;
- create, by the at least one processor, a framework-termination classloader, wherein the framework-termination classloader is a parent classloader of the framework-defined classloader;
- replace, by the at least one processor and using a reflection function, the application classloader with a new application classloader, wherein the new application classloader is a parent classloader of the framework-termination classloader, wherein the new application classloader is configured to send, to one of the application classloader or the framework-defined classloader, a request for a requested class, and wherein the framework-defined classloader is configured to, in response to the framework-defined classloader receiving the request for the requested class from the new application classloader, send the request for the requested class to the framework-termination classloader; and
- transmit, by the at least one processor, via the communication interface, and to a user device, the new application classloader, the framework-defined classloader, and the framework-termination classloader.

16. The computing platform of claim 15, wherein the one or more child application-defined classloaders indicate one or more third-party libraries comprising a plurality of classes, and wherein the memory stores additional computer-readable instructions that, when executed by the at least one processor, cause the computing platform to:
- identify, by the at least one processor and from the plurality of classes, the second class; and
- identify, by the at least one processor and based on the second class, the first class.

17. The computing platform of claim 16, wherein the memory stores additional computer-readable instructions that, when executed by the at least one processor, cause the computing platform to:
- create, by the at least one processor, a framework library comprising the first class; and
- link, by the at least one processor, the framework-defined classloader to the framework library.

18. The computing platform of claim 15, wherein the framework-defined classloader indicates a framework library comprising the first class, wherein the application classloader indicates a third-party library comprising the second class, wherein the framework-defined classloader is a child classloader to the application classloader, and wherein the memory stores additional computer-readable instructions that, when executed by the at least one processor, cause the computing platform to:
- receive the request for the requested class, wherein the requested class comprises a same class name as the first class and the second class;
- forward the request to the framework-defined classloader; and
- retrieve the requested class from the framework library.

19. The computing platform of claim 18, wherein the memory stores additional computer-readable instructions that, when executed by the at least one processor, cause the computing platform to:
- forward the request to the framework-termination classloader; and
- in response to forwarding the request to the framework-termination classloader, receive a class not found exception;
- wherein the retrieving the requested class from the framework library is based on the class not found exception.

20. One or more non-transitory computer-readable media storing instructions that, when executed by a computing platform comprising at least one processor, memory, and a communication interface, cause the computing platform to:
- receive, by the at least one processor, an application classloader corresponding to a mobile application, wherein the application classloader indicates one or more child application-defined classloaders;
- create, by the at least one processor, a framework-defined classloader comprising a first class that conflicts with a second class in the one or more child application-defined classloaders;
- create, by the at least one processor, a framework-termination classloader, wherein the framework-termination classloader is a parent classloader of the framework-defined classloader;
- replace, by the at least one processor and using a reflection function, the application classloader with a new application classloader, wherein the new application classloader is a parent classloader of the framework-termination classloader, wherein the new application classloader is configured to send, to one of the application classloader or the framework-defined classloader, a request for a requested class, and wherein the framework-defined classloader is configured to, in response to the framework-defined classloader receiving the request for the requested class from the new application classloader, send the request for the requested class to the framework-termination classloader; and
- transmit, by the at least one processor, via the communication interface, and to a user device, the new application classloader, the framework-defined classloader, and the framework-termination classloader.

* * * * *